Sept. 14, 1926.  K. E. PEILER  1,600,195

MOLD FOR GLASSWARE

Filed Dec. 18, 1925

Inventor:
Karl E. Peiler
by Robson D. Brown
Atty.

Patented Sept. 14, 1926.

1,600,195

UNITED STATES PATENT OFFICE.

KARL E. PEILER, OF WEST HARTFORD, CONNECTICUT, ASSIGNOR TO HARTFORD-EMPIRE COMPANY, OF HARTFORD, CONNECTICUT, A CORPORATION OF DELAWARE.

MOLD FOR GLASSWARE.

Application filed December 18, 1925. Serial No. 76,210.

The invention relates to molds for shaping articles of glassware and it has particular relation to molds having a funnel or guide associated therewith for directing segregated mold charges delivered from a glass feeding device into accurate position in the mold.

It is desirable in devices of this character, to maintain the funnel or guide at a temperature lower than that of the mold, in order to prevent the glass from adhering to the funnel. If the funnel is formed integrally with the body portion of the mold, the transfer of heat thereto from the mold through conduction will maintain the funnel at a temperature substantially that of the mold.

One of the objects of the present invention is to prevent excess or harmful heating of the funnel by providing means for independently cooling the funnel and for minimizing the exchange of heat between one or both of the body portions of the mold and the funnel.

Other objects of the invention will appear from the following description and claims.

In the accompanying drawings:—

Figure 1:
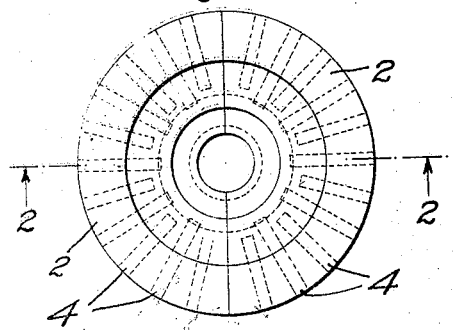
Figure 1 is a plan view of a divided mold having a funnel portion formed integrally with each half or section and partially separated therefrom by a series of radially extending apertures.
Figure 2:
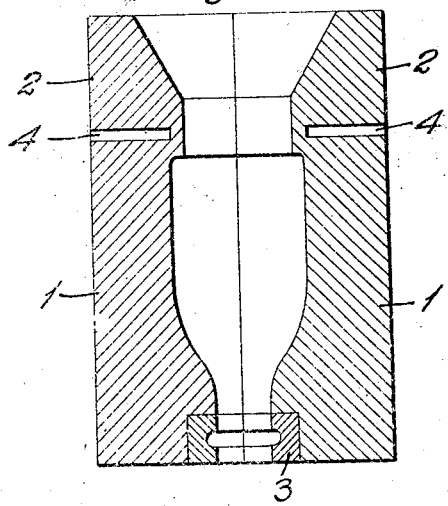
Fig. 2 is a vertical sectional view taken on line 2—2 of Fig. 1.

Referring to the drawings, a divided mold constructed according to the invention is shown in Figs. 1 and 2 as comprising two cooperating halves, each composed of a body portion 1, a funnel portion 2, formed integrally therewith, and a neck ring 3. At the juncture of the funnel and body portions a plurality of radially extending apertures 4 is provided which reduces the amount of metal at this point and materially reduces the amount of heat transferred from the body of the mold to the funnel through conduction. These apertures or holes also permit access of air between the body and funnel portions of the mold, thereby providing insulation which minimizes the transfer of heat to the funnel through radiation.

Figure 3:
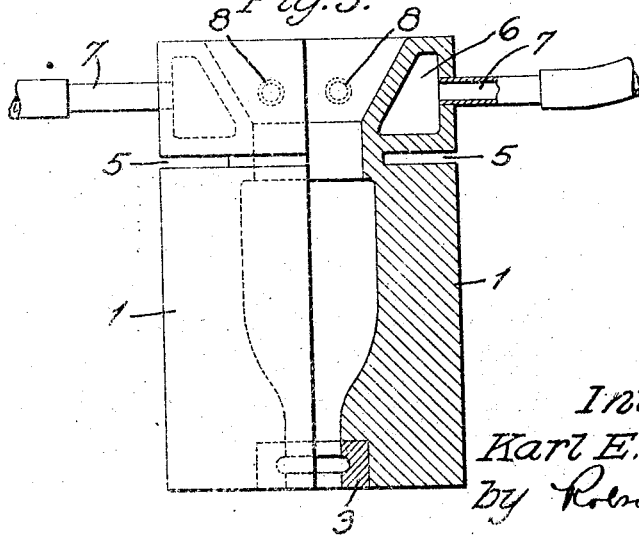
Fig. 3 is a view partly in side elevation and partly in vertical section, illustrating another embodiment of the invention.

In Fig. 3 there is illustrated a further embodiment of the invention wherein each mold half is formed with a groove 5 at the juncture of its body and funnel portions. In this embodiment the funnel portion 2 is of shell-like structure to provide a passage 6 for the circulation of a cooling medium such as air or water which is admitted and withdrawn through pipes 7 and 8.

The groove 5 materially reduces the cross-sectional area of the mold at this point and effectively reduces the exchange of heat between the body and funnel portions of the mold. That is to say, the heat of the mold is prevented from being transmitted readily to the funnel and, conversely, the cooling medium circulating about the funnel is prevented from materially lowering the temperature of the body portion of the mold.

The illustrated embodiments of the invention may be modified in construction and arrangement without departing from the scope of the invention as set forth in the appended claims.

I claim as my invention:—

1. A mold for glassware comprising a body portion, a funnel associated therewith, and means for cooling said funnel.

2. A mold for glassware comprising a body portion, a funnel associated therewith, and means for circulating a cooling medium around said funnel.

3. A mold element for glassware comprising a body portion, a funnel portion formed integrally therewith, and means for reducing the conduction of heat from the body portion to said funnel portion.

4. A mold element for glassware comprising a body portion and an integral funnel portion, and means disposed between said portions for reducing the exchange of heat therebetween.

5. A mold element for glassware comprising a body portion and a funnel portion, and a recess disposed between said portions for reducing the exchange of heat therebetween.

6. A mold element for glassware comprising a body portion and a funnel portion, and a portion of relatively low thermal conductivity disposed between said body and funnel portions for reducing the exchange of heat therebetween.

7. A mold element for glassware comprising a body portion and an integral funnel portion, the material connecting said portions being partially cut away to reduce the exchange of heat therebetween.

8. A mold element for glassware comprising a body portion and an integral funnel portion, the material disposed between said portions being of reduced cross-sectional area to reduce the exchange of heat therebetween.

9. A mold element for glassware comprising a body portion and an integral funnel portion, and a ventilating passageway formed in said mold at the juncture of said portions to reduce the exchange of heat therebetween.

10. A mold element for glassware comprising a body portion and an integral funnel portion, and a passageway disposed between said portions for circulation of a cooling medium.

11. A mold element for glassware comprising a body portion and a funnel portion, a passageway formed in said mold at the juncture of said body and funnel portions for the circulation of cooling air, and a passageway formed in said funnel portion for the circulation of a cooling medium.

12. A mold element for glassware comprising a body portion and an integral funnel portion, and having an annular groove provided therein at the juncture of said body and funnel portions for the circulation of cooling air, and a passageway formed in said funnel portion for the circulation of a cooling fluid.

13. A mold element for glassware comprising a body portion and a funnel portion formed integrally therewith and having a plurality of recesses formed in said element adjacent to the juncture of said body and funnel portions to minimize the exchange of heat therebetween.

14. A mold element for glassware comprising a body portion and a funnel portion formed integrally therewith, and having a plurality of radially extending recesses formed in said element adjacent to the juncture of said portions to reduce the exchange of heat therebetween.

Signed at Hartford, Conn., this 16th day of December, 1925.

KARL E. PEILER.